Patented Oct. 20, 1936

2,058,111

UNITED STATES PATENT OFFICE 2,058,111

PAINT

George F. A. Stutz and Adolf C. Elm, Palmerton, Pa., assignors to The New Jersey Zinc Company, New York, N. Y., a corporation of New Jersey No Drawing. Application December 1, 1930, Serial No. 499,311

16 Claims. (Cl. 134—39)

This invention relates to paint and particularly to paint containing pigment and oleoresinous vehicle. The invention aims to provide a method of improving the physical and colloidal properties of the paint, in particular, the leveling and working properties of the paint, especially of a gloss paint, and, in particular, of a paint containing lithopone.

The physical and colloidal properties of a paint determine its consistency characteristics, its ease of working, ease of brushing, its flow characteristics, its ability to level, and its aging properties such as non-settling, thickening and the like. The leveling quality of a paint is its ability to flow out and obliterate brush marks and to assume, when dry, a uniformly smooth and even surface. Good leveling is desirable in all paints and is of special significance in gloss paints such as enamels. A number of white pigments, including lithopone, are widely used as white pigments in gloss as well as in flat paints and considerable difficulty has heretofore been encountered in dispersing these pigments in the vehicle, particularly an oleoresinous vehicle, so as to secure satisfactory leveling in the resulting paint.

The present invention is particularly concerned with the improvement in the dispersing properties of pigments, and in particular lithopone, so as to secure superior leveling and working properties, particularly in gloss paint. To this end the invention contemplates certain improvements in the manufacture of pigments and particularly of lithopone by which the dispersing properties of the pigments are materially improved. The contemplated improvement in the dispersing properties of lithopone or of other pigments may be effected through the medium of the vehicle rather than through the pigment itself. Hence, in a broader aspect, the invention contemplates the improvement of the leveling and working qualities of paints in general.

The invention is based on our discovery that the dispersing properties of a pigment such as lithopone in a paint vehicle are substantially improved by the presence of an appropriate organic condensation product in which the group C=S is present, during the incorporation of the pigment in the vehicle. Such an appropriate condensation product may be that formed by the condensation of carbon disulphide with a secondary amine (thio-carbamates) or thio urea or any of its organic derivatives. The condensation product may be initially associated with either the pigment or the vehicle.

In the practice of the invention we prefer to associate the carbon disulphide condensation product with the lithopone at some appropriate stage in its course of manufacture. In the case of lithopone this is preferably done after calcination. As a specific example we have secured satisfactory results by adding less than .25% of zinc dibutyl di-thio-carbamate (calculated by weight on the dry weight of the pigment) to the ball mill during the finish grinding or to the dry pigment during disintegration. Greater amounts of this di-thio-carbamate do not give correspondingly greater improvement and have not been found necessary in actual practice. The carbon disulphide condensation product is probably oriented at the surface of the pigment in such a way that its C=S group is in contact with the pigment while the remainder of the molecule is in contact with the vehicle. It is probable that the tendency of this group to cause the molecule to orient is responsible for the improvement in dispersing properties noted on the foregoing page.

Such carbon disulphide condensation products, when added to the pigment, may form salts by the reaction with the free barium, calcium, magnesium, sodium, or zinc compounds present in the lithopone. Since a number of these condensation products are unstable in the free acid form, it is often more desirable to use the corresponding salts such as the sodium or zinc salts or the corresponding esters.

Among the materials which may be specifically mentioned as examples of the carbon disulphide condensation products giving the improved leveling and working properties, may be listed the following:

Zinc (or sodium) dimethyl di-thio-carbamate
Zinc (or sodium) diethyl di-thio-carbamate
Zinc (or sodium) dibutyl di-thio-carbamate
Zinc (or sodium) dipropyl di-thio-carbamate
Zinc (or sodium) diamyl di-thio-carbamate
Diethylamino diethyl di-thio-carbamate
Dimethyl ammonium dimethyl di-thio-carbamate
Piperidine piperidyl di-thio-carbamate
Thio urea
Diortho tolyl thio urea
Carbon disulphide condensation product with butyraldehyde aniline.

The improvement in leveling and working properties is effected in some cases with an addition of .0025% of the condensation product (calculated by weight on the dry weight of the pigment), and in no case is the amount required to effect the improvement greater than .25%. The addition of such di-thio-carbamates to pigments such as zinc sulphide, titanium dioxide, titanium-barium pigment, and the like gives substantially the same result with respect to improved leveling and working properties as in the case of lithopone.

It is probable that the carbon disulphide condensation product added to the pigment is finally orientated at the interface between the pigment surface and the vehicle forming a third phase markedly influencing the interfacial reactions, such as the wetting and dispersing characteristics of the vehicle for the pigment. It is probable that such orientation is due to the presence of the C=S group, the orientation taking place in such a manner as to have this C=S group in contact with the surface of the pigment, while the rest of the molecule is presented to the vehicle. In any case the presence of the C=S group is coincident with the improvement in leveling and working properties of the paint.

Pigments embodying the improvement of the invention possess superior dispersing properties in paint vehicles, particularly of the oleoresinous type, resulting in paints of improved physical and colloidal properties. This superior dispersing property imparts to the paint a marked improvement in its leveling quality in particular and in its working characteristics, ease of flow, ease of brushing, non-settling characteristics, and the like. It does not adversely affect any other property of the pigment and in particular does not cause the pigment to thicken in paint nor to discolor, nor does it appreciably affect the drying time.

As hereinbefore mentioned, the improvement in leveling properties and flow characteristics of the paint may be obtained by adding the carbon disulphide condensation product directly to the vehicle or to the paint, rather than incorporating it in the pigment as hereinbefore particularly described. While it has been our experience that this alternative method is not entirely as efficient as our preferred practice, it has given satisfactory results in actual practice. While the improvement in leveling quality and flow characteristics of the invention shows to best advantage with a gloss or an enamel type of vehicle, a corresponding, although perhaps not as great improvement, is evident with semi-gloss and with flat vehicles.

We claim:

1. The method of improving the dispersing properties of a pigment so as to secure improved leveling in paint made therefrom which comprises associating less than .25% of a carbon disulphide condensation product with the pigment in the course of its manufacture.

2. The method of improving the dispersing properties of lithopone so as to secure improved leveling in paint made therefrom which comprises associating less than .25% of a carbon disulphide condensation product with the pigment in the course of its manufacture.

3. The method of improving the leveling quality and flow characteristics of paints which comprises mixing the paint vehicle and pigment in the presence of less than .25% of a condensation product of carbon disulphide with a secondary amine.

4. The method of improving the leveling quality and flow characteristics of paints which comprises mixing the paint vehicle and pigment in the presence of less than .25% of zinc dibutyl di-thio-carbamate.

5. The method of improving the dispersing properties of lithopone so as to secure improved leveling in paint made therefrom which comprises adding less than .25% of a carbon disulphide condensation product to the calcined lithopone in the finishing stages of its manufacture.

6. The method of improving the dispersion of lithopone in a paint vehicle so as to secure improved leveling in the resulting paint which comprises carrying out the mixing of the lithopone and the vehicle in the presence of less than .25% of an organic condensation product in which the group C=S is present.

7. The method of improving the dispersing properties of lithopone so as to secure improved leveling in paint made therefrom which comprises adding less than .25% of a carbon disulphide condensation product to the calcined lithopone in the finishing stages of its manufacture.

8. The method of improving the dispersing properties of lithopone so as to secure improved leveling in paint made therefrom which comprises adding less than .25% of a carbon disulphide condensation product to the lithopone at any appropriate stage in the course of its manufacture.

9. The improvement in the manufacture of lithopone which comprises associating less than .25% of a carbon disulphide condensation product with the lithopone at any appropriate stage in the course of its manufacture.

10. The improvement in the manufacture of lithopone which comprises adding less than .25% of a carbon disulphide condensation product to the calcined lithopone in the finishing stages of its manufacture.

11. The improvement in the manufacture of lithopone which comprises adding less than .25% of a carbon disulphide condensation product to the lithopone at any appropriate stage in the course of its manufacture.

12. The improvement in the manufacture of lithopone which comprises adding less than .25% of a carbon disulphide condensation product to the calcined lithopone in the finishing stages of its manufacture.

13. The method of improving the leveling quality and flow characteristics of paints which comprises mixing the paint vehicle and pigment in the presence of less than .25% of the condensation product of carbon disulphide and butyraldehyde aniline.

14. The method of improving the leveling quality and flow characteristics of paints which comprises mixing the paint vehicle and pigment in the presence of less than .25% of diorthotolylthiourea.

15. The method of improving the leveling quality and flow characteristic of paints containing zinc sulphide which comprises mixing the zinc sulphide and paint vehicle in the presence of less than .25% of an organic condensation product of carbon disulphide.

16. The method of improving the leveling quality and flow characteristics of paint which comprises mixing the paint vehicle and pigment in the presence of less than .25% of an organic condensation product of carbon disulfide.

GEORGE F. A. STUTZ.
ADOLF C. ELM.